United States Patent
Lähteenmäki et al.

(10) Patent No.: US 7,469,154 B2
(45) Date of Patent: Dec. 23, 2008

(54) COMMUNICATION DEVICE

(75) Inventors: Markku Lähteenmäki, Helsinki (FI); Esa Määttä, Tampere (FI); Jari Saukko, Tampere (FI); Michael Josenhans, Haltern (DE)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 09/975,516

(22) Filed: Oct. 10, 2001

(65) Prior Publication Data

US 2002/0042291 A1    Apr. 11, 2002

(30) Foreign Application Priority Data

Oct. 11, 2000  (FI) .................................. 20002244

(51) Int. Cl.
*H04M 1/00*  (2006.01)

(52) U.S. Cl. .................................. 455/566; 455/575.1

(58) Field of Classification Search ............ 455/575.1, 455/90.1–90.3, 556.1, 556.2, 348, 349, 566; 379/428.01, 428.03, 428.04, 433.01, 433.04, 379/433.07
See application file for complete search history.

(56) References Cited

U.S. PATENT DOCUMENTS

| | | | | |
|---|---|---|---|---|
| 3,838,229 | A | 9/1974 | Morrell et al. | 179/100 D |
| 5,140,632 | A | 8/1992 | Anten | 379/447 |
| 5,715,524 | A | 2/1998 | Jambhekar et al. | 455/90 |
| 5,745,566 | A * | 4/1998 | Petrella et al. | 379/433.13 |
| 5,802,171 | A | 9/1998 | Deutsch | 379/419 |
| 5,848,152 | A | 12/1998 | Slipy et al. | 379/433 |
| 5,857,157 | A | 1/1999 | Shindo | 455/550 |
| 5,924,044 | A | 7/1999 | Vannatta et al. | 455/556 |
| 5,999,827 | A * | 12/1999 | Sudo et al. | 455/564 |
| 6,009,164 | A | 12/1999 | Yun | 379/368 |
| 6,226,501 | B1 * | 5/2001 | Weadon et al. | 455/575.3 |
| 6,233,469 | B1 * | 5/2001 | Watanabe | 455/575.1 |
| 6,349,221 | B1 * | 2/2002 | Wolf et al. | 455/566 |
| 6,453,170 | B1 * | 9/2002 | List et al. | 455/550.1 |
| 2001/0012769 | A1 * | 8/2001 | Sirola et al. | 455/90 |

FOREIGN PATENT DOCUMENTS

| | | |
|---|---|---|
| DE | 3049032 A1 | 7/1982 |
| DE | 4107365 A1 | 9/1992 |
| DE | 29922457 U1 | 4/2000 |
| EP | 0354367 A2 | 2/1990 |
| FR | 2677143 | 12/1992 |
| GB | 2293517 A | 3/1996 |
| GB | 2333926 A | 8/1999 |

(Continued)

*Primary Examiner*—Sam Bhattacharya

(57) ABSTRACT

A communication device a housing having at least a first part and a second part, and means for providing user interface functions having at least first input means and a display. The user interface is arranged to be replaceable by placing a replacement cover in a detachable manner in connection with the housing, substantially in parallel with the second part. The replacement cover is arranged to be placed either onto or in place of the second part and includes at least means (3, 6) for providing key functions. A method is disclosed where the user interface is changed by placing a replacement cover in a detachable manner in connection with the housing, substantially in parallel with the second part. The replacement cover can be placed either onto or in place of the second part. Said replacement cover is equipped with at least means for providing key functions.

11 Claims, 11 Drawing Sheets

FOREIGN PATENT DOCUMENTS

| | | |
|---|---|---|
| IL | 093998 | 4/1990 |
| WO | WO 97/32423 | 9/1997 |
| WO | WO 97/42743 | 11/1997 |
| WO | WO 98/10571 | 3/1998 |
| WO | WO 00/41380 | 7/2000 |

* cited by examiner

COMMUNICATION DEVICE

BACKGROUND OF THE INVENTION

1. Field of the Invention

The present invention relates to a communication device communication device comprising at least a housing which comprises at least a first part and a second part, and means for providing user interface functions, comprising at least a first keypad and a display. The present invention also relates to a method for changing the user interface in a communication device comprising at least a housing which comprises at least a first part and a second part, and means for providing user interface functions, comprising at least a first keypad and a display.

2. Brief Description of Related Developments

Wireless communication devices are known which comprise, in addition to ordinary telephone functions, implementations of other functions, such as various games, a calendar, a calculator, WAP/WEB applications, etc. For controlling and playing games, such wireless communication devices apply the keys designed for telephone and text message functions of the wireless communication device, a joystick, a track ball, membrane keys, or the like. For example, the wireless communication device of prior art as shown in FIG. 1 comprises a browsing key N for performing most of the functions of the wireless communication device. This browsing key is also used in game functions. Furthermore, arrow keys R, L can be used for playing games. However, these keys are relatively small in size, and their placement is not designed for game functions. In practice, these keys of a wireless communication device of prior art are poorly suited for playing games, particularly so-called action games which require quick reactions. Thus, playing games may be difficult and even impossible, which reduces interest in playing games with a wireless communication device of prior art.

In wireless communication devices of prior art, the display device is relatively small in size, due to e.g. the fact that the aim has been to reduce the size of the wireless communication devices. Thus, the quantity and size of information to be presented on the display can be small, and the display may not always show simultaneously all the information that is necessary for using the application. Thus, also the quantity of information to be displayed in connection with games is limited, and playing a game may become more difficult, because the player has difficulties in perceiving the visual information of the game.

Devices are also known which comprise, in addition to mobile station functions, other data processing functions, such as functions known from personal digital assistants (PDA). One such known device is Nokia Communicator 9110, which can be used to communicate with the Internet network, to perform mobile phone functions, such as receiving a call and selecting a telephone number, and to receive for example telecopy messages. In this description, a wireless communication device also refers to a wireless communication device which may contain functions of the above-described personal digital assistant or a corresponding device. Such a communication device comprises, in addition to a telephone keypad, also another keyboard which is primarily intended for controlling data processing functions. This second keyboard is preferably a so-called QWERTY keyboard which preferably comprises the alphanumerical keys, whereby it can be used, for example, for inputting text more easily than by using the telephone keypad. The Nokia Communicator 9110 communication device has a two-piece foldable housing. The first part comprises a display and a keypad for the telephone functions, and the second part comprises a display and a keyboard for e.g. the data processing functions. However, the aim has been to keep the size of the communication device such that the device is easily portable. Thus, also the keys of the second keyboard are relatively small and are not particularly well suited for playing games, especially games which require quick action.

SUMMARY OF THE INVENTION

It is an aim of the present invention to provide a communication device with a replaceable user interface. The invention is based on the idea that the user interface of the communication device can be replaced by placing a replacement housing in a detachable manner in connection with the housing, in parallel with the second part, either onto or in place of the second part. Such a replacement cover comprises at least means for providing key functions. More precisely, the communication device according to the present invention is characterized in that the user interface is arranged to be replaceable by placing a replacement cover in a detachable manner in connection with the housing, substantially parallel to the second part, onto or in place of the second part, and that said replacement cover comprises at least means for providing key functions. The method according to the present invention is characterized in that in the method, the user interface is changed by placing a replacement cover in a detachable manner in connection with the housing, substantially parallel to the second part, onto or in place of the second part, and that said replacement cover is equipped with at least means for providing key functions.

Considerable advantages are achieved by the present invention when compared with communication devices of prior art. Various user interfaces can be changed in the communication device of the invention, for different functional needs. In the communication device according to an advantageous embodiment of the invention, the layout of the different parts of the user interface is also more free than in communication devices of prior art. Using a communication device of the invention, it is easier, for example, to play games, because the wireless communication device can be provided with special keys for games. The size of such special keys can be made larger than the keys in the conventional keyboard of the wireless communication device. Furthermore, these keys provided for game functions can be placed in a way advantageous for playing games, wherein finding the keys quickly is easier than in wireless communication devices of prior art. Yet another advantage to be mentioned is that the size of the display can also be enlarged, thereby further improving the facility to play games.

BRIEF DESCRIPTION OF THE DRAWINGS

In the following, the present invention will be described in more detail with reference to the appended drawings, in which.

DETAILED DESCRIPTION OF THE PREFERRED EMBODIMENT (S)

Figure 1:
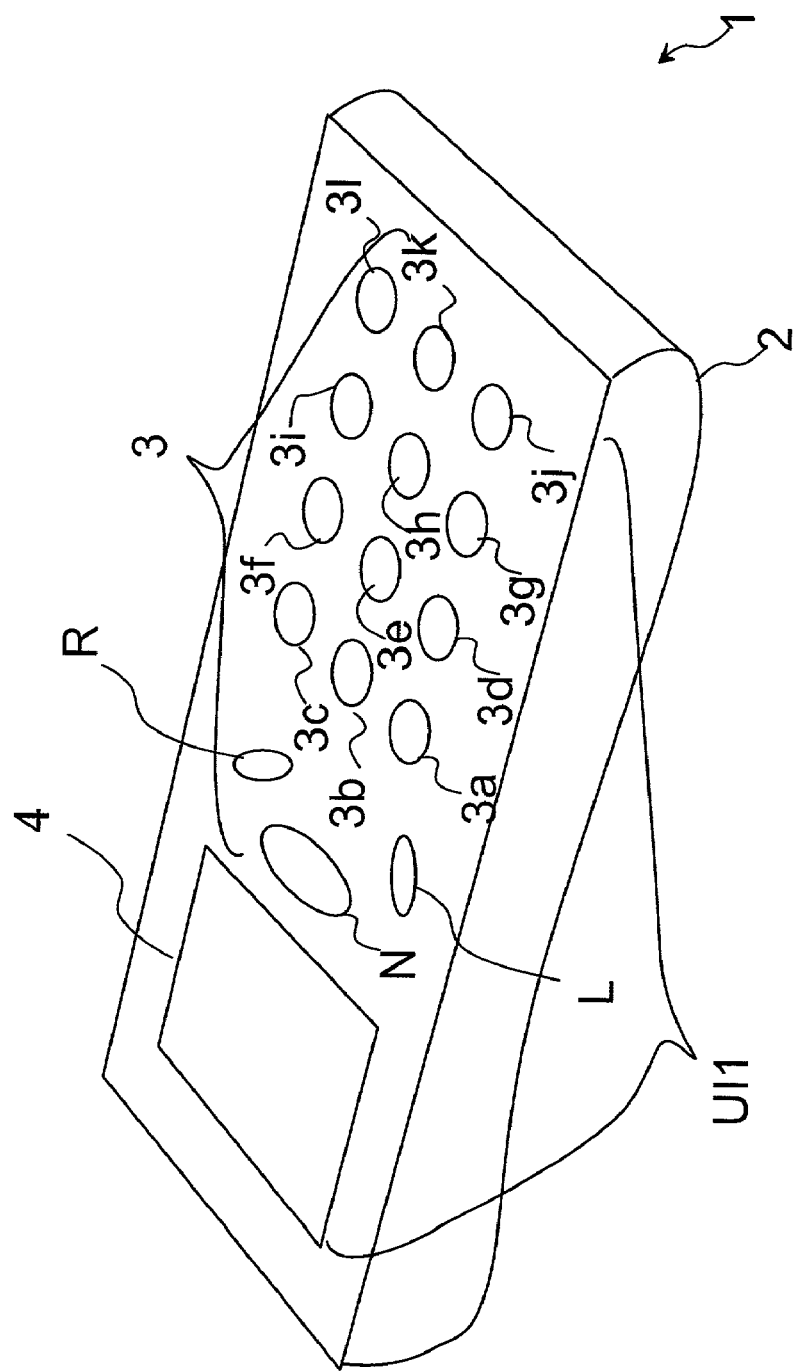
FIG. 1 shows a communication device of prior art, equipped with game facilities, seen from above.
Figure 2A:
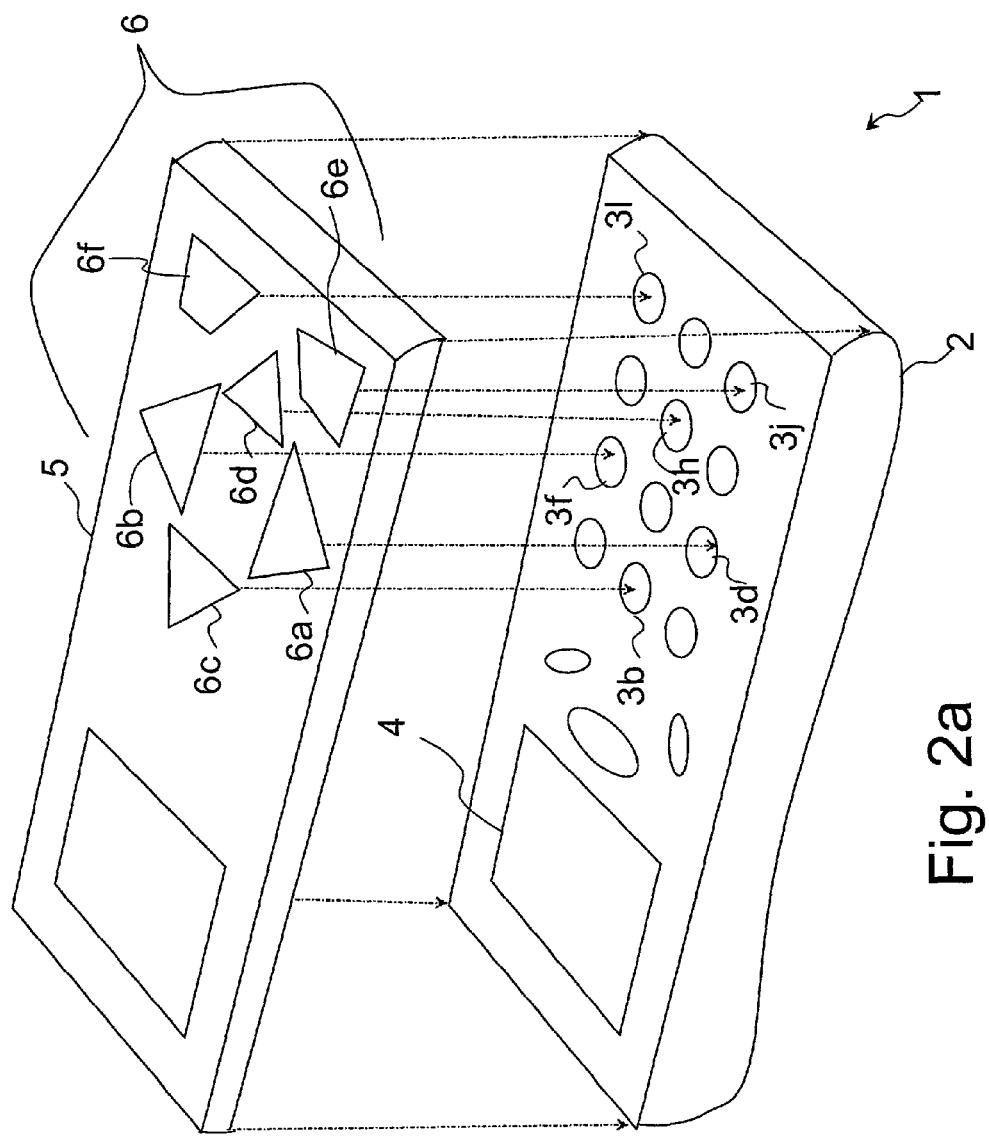
FIG. 2a shows a communication device according to a preferred embodiment of the invention in a partial explosion view.

The appended FIG. 2a shows a communication device 1 complying with a preferred embodiment of the invention in a partial explosion view. It comprises e.g. a housing 2 and a first user interface Ul1, preferably provided with a keypad 3 and a display 4. In this advantageous embodiment, the communication device 1 also comprises a replacement cover 5 provided with a second user interface comprising at least a keypad 6. For ordinary telephone functions, the first housing 2 of the communication device 1 is used, its second part 2a being preferably provided with a keypad 3 and a display 4 for a first user interface Ul1. In this functional position, the replacement cover 5 is detached. Thus, the user can, in a way known as such, for example select a telephone number, answer an incoming call, change the settings of the communication device, etc. The communication device 1 used can be e.g. a wireless communication device, such as a GSM mobile station, a communicator, a GPRS mobile station, a UMTS mobile station, etc., but also a cabled telecommunication terminal, such as a personal computer (PC), a PDA device, etc. Instead of or in addition to said keypad 3, the user interface Ul1 may also comprise other input means, such as a roll controller, a joystick, audio control means (e.g. a microphone, not shown in the appended drawings), etc., for entering text, commands, selections, and so on. The user interface may also comprise other audio means, such as a speaker and/or an earpiece (not shown).

In a situation in which the user wishes to shift to the game functions, the following steps are taken in connection with this communication device according to an advantageous embodiment of the invention. The user selects the game function by means of the keypad 3, wherein the communication device 1 shifts to a second mode with the facility to play games. Information is preferably displayed on the display 4 that the communication device 1 has shifted to this second mode. After this, the user can preferably select which game he/she wants to play. The selected game can be stored in the memory means 9 of the communication device (FIG. 5), or the game can be e.g. downloaded from a communication network, such as the Internet network. If the game is downloaded from a communication network, a data transmission connection is set up from the communication device 1 to this communication network in a way known as such, preferably by means of mobile station functions 10. However, it is obvious that the game can be downloaded e.g. from a local area network, wherein the data transmission connection used can be e.g. a wireless infrared connection (e.g. IrDA), a wireless radio connection (Bluetooth, WLAN), or a cabled connection between e.g. a PC (not shown) and the communication device 1, or a modem connection to a telecommunication network.

After selection of the game function and possible downloading of a game, the user places a replacement cover 5 onto the housing 2 of the communication device 1. This replacement cover 5 is equipped with at least a keypad 6, in which the size and layout of the keys is designed in such a way that it is easy to play games. However, in the layout of the keys of this keypad 6, one must also consider the layout of the keys in the keypad 3 of the communication device, because pressing the keys of the keypad 6 is detected in this communication device 1 according to an advantageous embodiment of the invention by means of keystrokes of the keys 3, as will be described below.

Figure 2B:
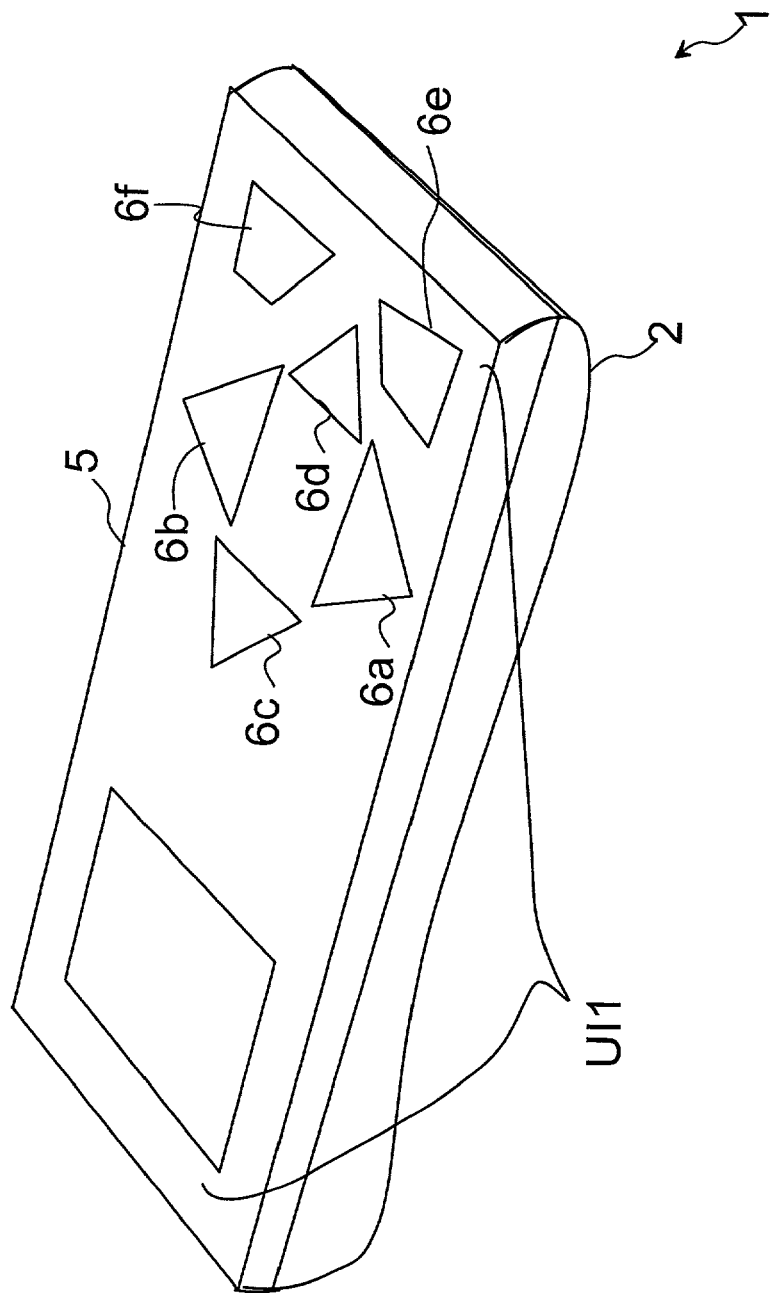
FIG. 2b shows the communication device according to the first preferred embodiment of the invention, shown in FIG. 2, in a second functional position.

After the replacement cover 5 has been installed, the user can start to play games. In the example of FIGS. 2a and 2b, the keypad 6 comprises four arrow keys 6a, 6b, 6c, 6d, as well as a first 6e and a second selection key 6f. In this preferred embodiment, the keys 6a-6f are advantageously placed as follows. The left arrow key 6a is at the left edge in the keypad, which is logical in view of the function of this key. In a corresponding manner, the right arrow key 6b is placed at the right edge, the up arrow key 6c is placed slightly in the centre of the keypad 6, slightly above the left and the right arrow keys 6a, 6b, and the down arrow key 6d is placed in the centre, slightly below the left and the right arrow keys 6a, 6b. The first and the second selection keys 6e, 6f are placed below the arrow keys 6a-6d. These keys 6a-6f are arranged to be movable in a direction substantially perpendicular to the main plane of the replacement cover 5. Thus, a keystroke will push down one of the keys in the keypad 3 of the communication device. Thus, the processor 11, or a possible keypad controller (not shown), in the communication device 1 will detect that a key has been pushed down. After this, it is determined which key was pushed down. The key information is transferred to the use of the running game program, wherein the game program will operate in a way required by the keystroke, e.g. move an object on the display. For example, the left arrow key 6a is at least partly placed at the numeric key "4" of the keypad 3 (indicated with reference 3d in FIG. 2a). Thus, pushing down the left arrow key 6a will push down the numeric key "4", which is detected in the communication device. Respectively, the right arrow key 6b is placed at least partly at the numeric key "6" of the keypad 3 (indicated with reference 3f in FIG. 2a), the up arrow key 6c is placed at least partly at the numeric key "2" of the keypad 3 (3b in FIG. 2a), and the down arrow key 6d is placed at least partly at the numeric key "8" of the keypad 3 (3f in FIG. 2a). The first selection key 6e is placed at least partly at the "*" key 3j, and the second selection key 6f is placed at least partly at the "#" key 3l. It is obvious that the present invention is not limited solely to the above-presented key arrangements, but when applying the invention, it is also possible to use other kinds of keypads 6 and combinations of the keypad keys 6a-6f and the keypad keys 3a-3l.

The communication device 1 of the invention is preferably provided with a facility to answer an incoming call also when the communication device 1 is set in the game mode. Answering a call in the came mode can be preferably made by any key in the keypad 6, or a specific key can be reserved for this purpose, which is used as a key for answering an incoming call. In a corresponding manner, at the end of a call, the call can be terminated either with any key in the keypad 6 or with a specific key in the keypad 6. Furthermore, the answering function can be set by the user, wherein the user can select e.g.

answering with any key or answering with a predetermined key or with a key selected by the user.

The replacement cover 5 is preferably equipped with an opening, or the replacement cover 5 is arranged in another way to be at least partly transparent at the display 4 of the communication device. Thus, the visual information of the game can be seen through this replacement cover 5, wherein a separate display will not be needed in the replacement cover.

The shift from the game mode back to the telephone mode can be made e.g. so that the user detaches the replacement cover 5 and, by means of the keypad 3, makes the shift from the game mode to the telephone mode in the settings of the communication device. It is obvious that the keypad 6 of the replacement cover 5 can also be used for terminating the game function, wherein the game function is terminated before detaching the replacement cover.

The attachment and detachment of the replacement cover 5 can be arranged in many ways known as such. For example, the replacement cover 5 can be provided with flexible fixing means (not shown) which are supported by counterparts (not shown) arranged in the housing 2 when the replacement cover 5 is placed onto the housing 2. At the stage of detaching the replacement cover, these flexible fixing means are e.g. pressed down, when they are bent and the replacement cover 5 can be withdrawn from the top of the housing 2. In this context, reference is made to the applicant's international patent application WO 97/32423 which presents one such solution for providing a detachable replacement cover in an electronic device.

Figure 3:
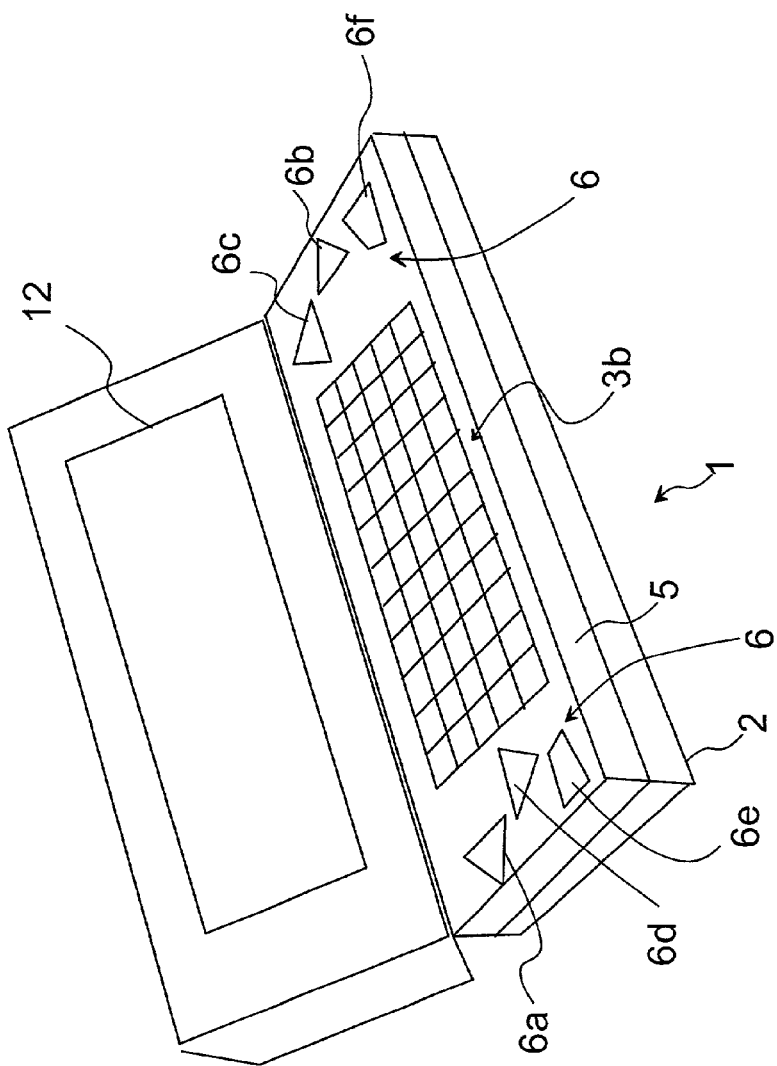
FIG. 3 shows a communication device according to a second advantageous embodiment of the invention.

The appended FIG. 3 shows a communication device 1 according to another advantageous embodiment of the invention. It comprises e.g. a housing 2 that can be opened, a two-part keyboard, a keypad 6, a display (not shown in FIG. 3), and a display 12. This communication device according to an advantageous embodiment, the first part of the keypad (not shown in FIG. 3) and the display are primarily used for ordinary telephone functions. The second part 3b of the keypad and the display 12 are primarily used for performing data processing functions. The keyboard 6 and the display 12 are used e.g. in game functions for playing games. In FIG. 3, the communication device 1 is shown in an opened position, with the replacement cover installed, wherein the keyboard 6 and the display 12 are available. The replacement cover can also be detached, wherein the second part 3b of the keyboard and the display 12 can be used normally.

The keyboard 6 is provided, e.g. for game functions, with keys 6a-6f whose size is preferably larger than the size of keys in the keypad used in telephone functions. Furthermore, in the layout of these keys, it has been considered, when possible, that playing the games should be as easy as possible. In this advantageous embodiment of the invention, the game mode is selected for example in the following way. The user opens the housing of the device, if it is not already opened, and uses the keyboard 6 to select the game mode from the settings. After this, the keys 6a-6f are set to correspond to the key functions required in the game functions, such as the arrow keys 6a-6d and the selection keys 6e, 6f. Also, the selection of the game is preferably made at this stage, wherein the loading of the game is started, either from a memory or via a data transmission connection, as already presented above in this description. Preferably, it is also possible to answer calls by means of the keyboard 6, even though the game mode were active in the communication device 1.

From the game function, it is possible to shift to the data processing functions preferably by changing the mode by means of the keyboard 6. Also the telephone functions can be used at this stage. If the housing 2 of the communication device is closed, the keypad 3 and the display 4 can be used for performing telephone functions.

An advantage in this communication device according to the second advantageous embodiment of the invention is, for example, that the size of the display 12 can be arranged relatively large when compared with the size of the display 4, wherein the visual information of the games can be perceived better.

Figure 4A:
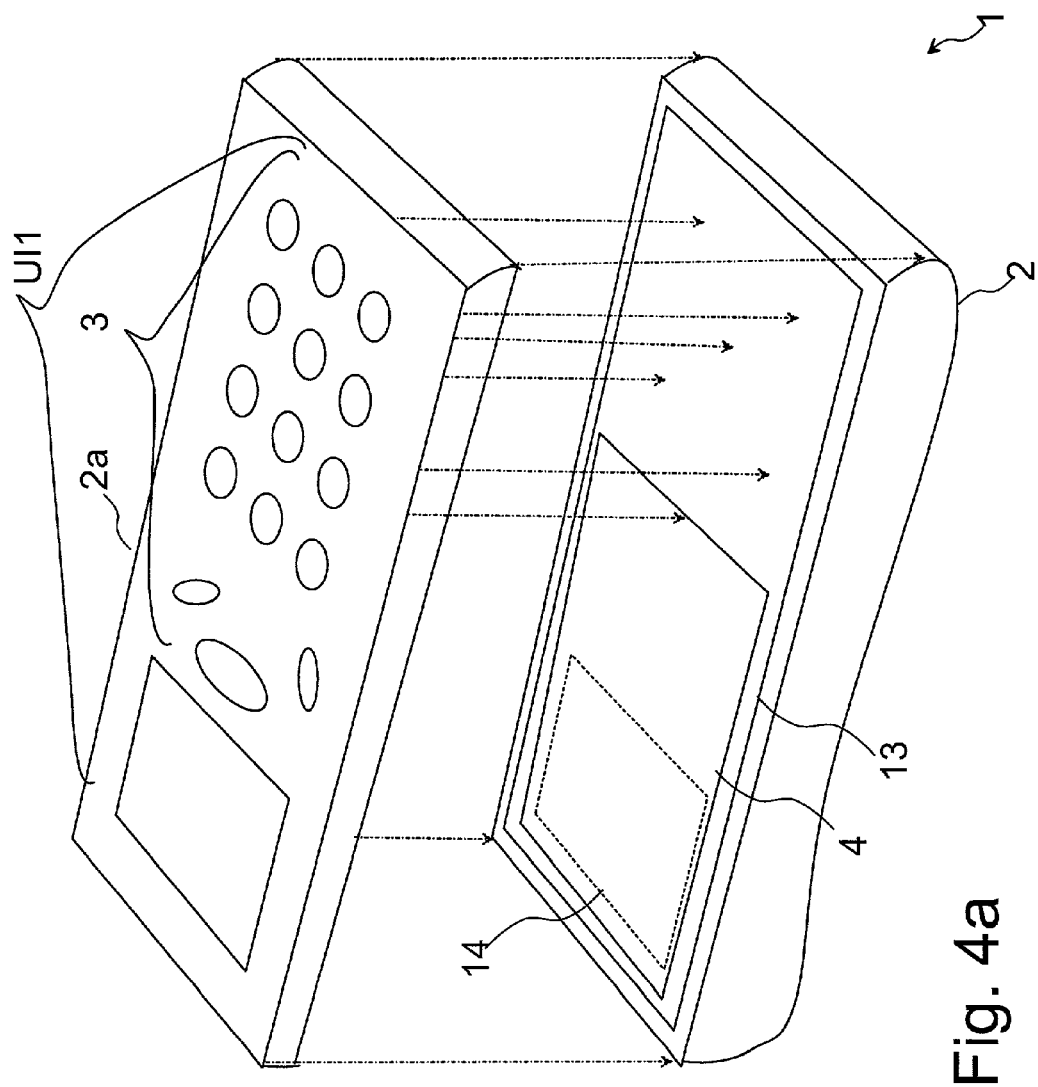
FIG. 4a shows, in a partial explosion view, a communication device according to a third advantageous embodiment of the invention, corresponding to the first functional position.
Figure 4B:
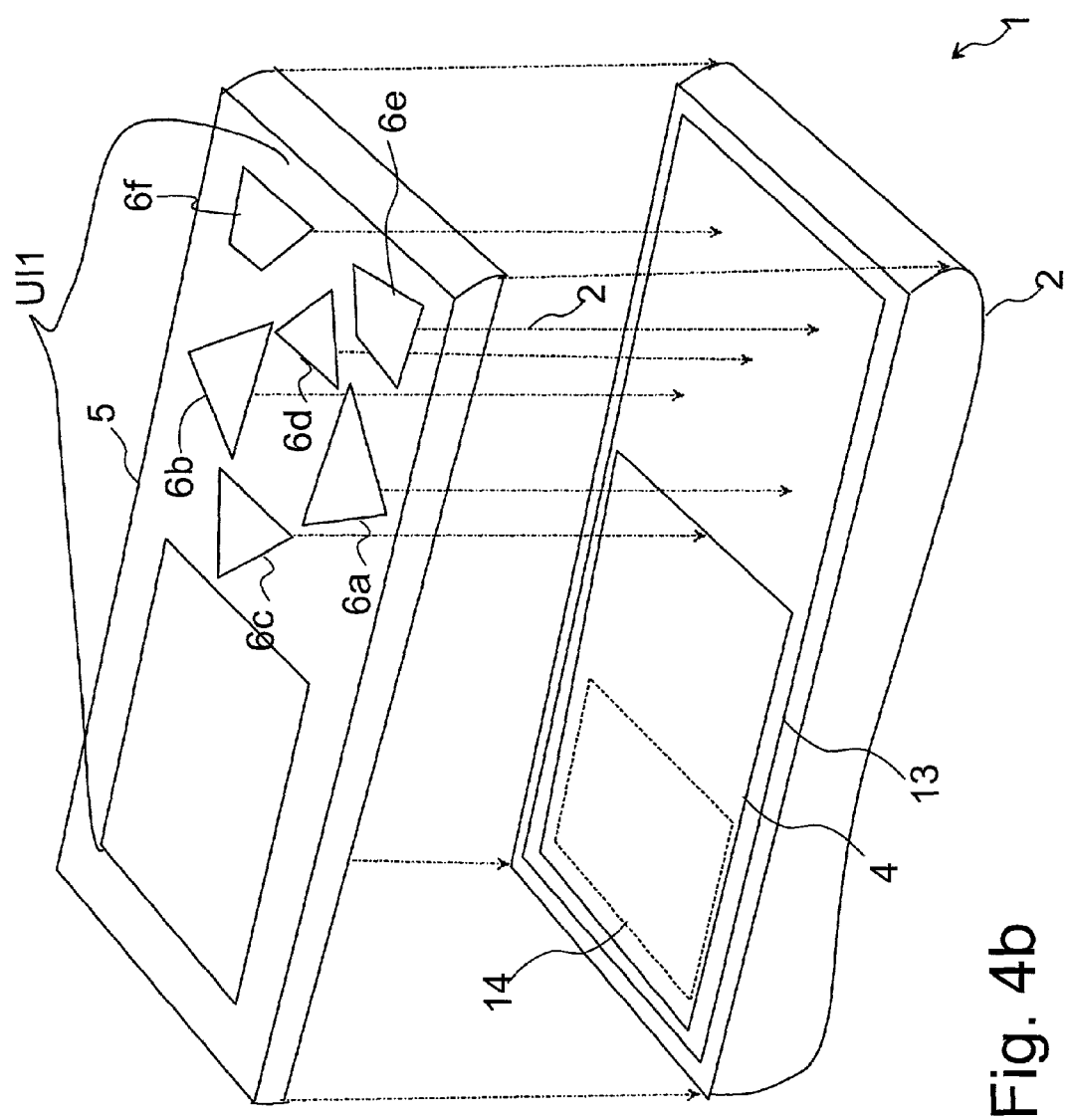
FIG. 4b shows, in a partial explosion view, a communication device according to the third advantageous embodiment of the invention, corresponding to the second functional position.
Figure 5:
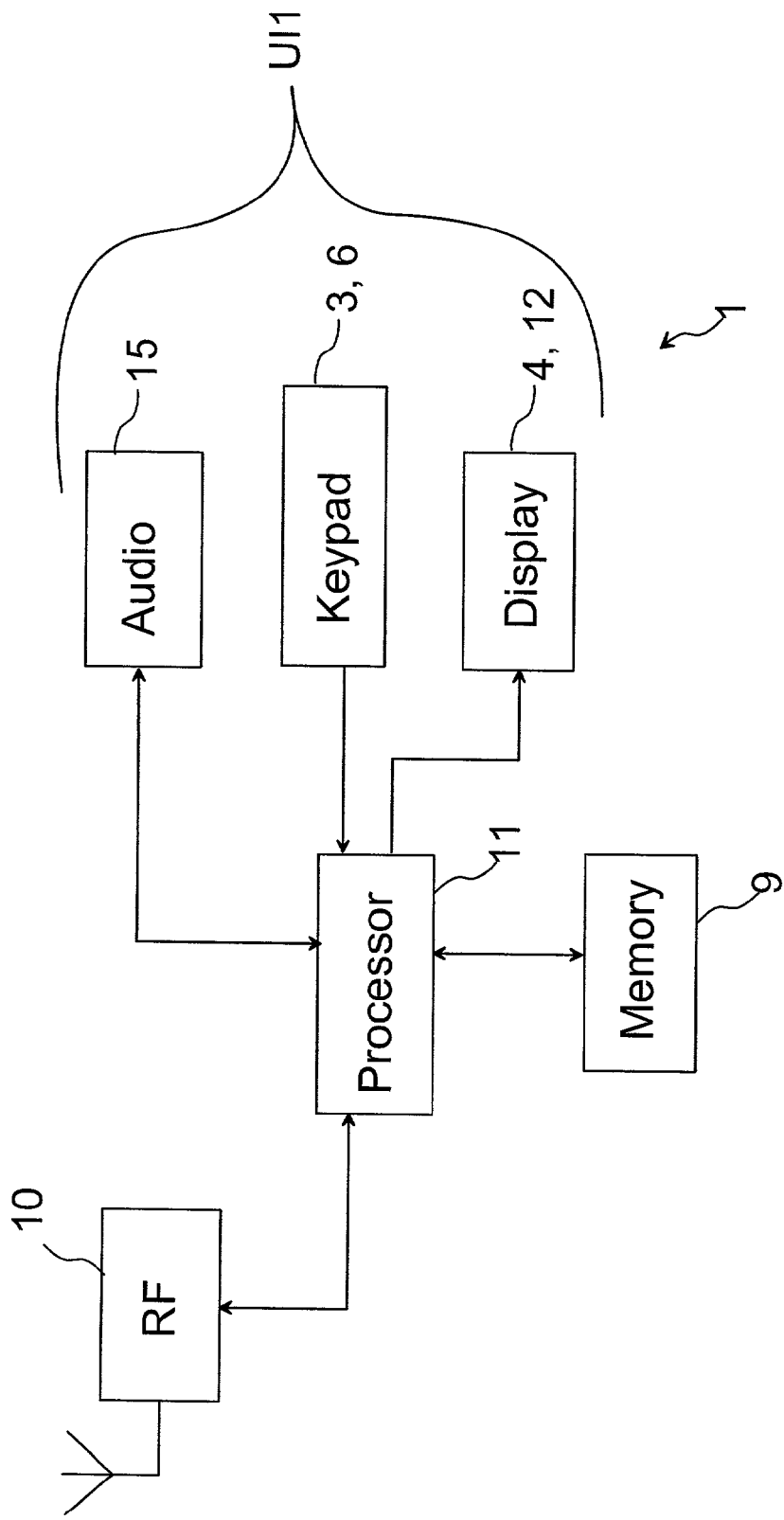
FIG. 5 shows, in a reduced block chart, a communication device according to the first advantageous embodiment of the invention.

The appended FIG. 4a shows, in a partial explosion view, a communication device 1 complying with a third advantageous embodiment of the invention, corresponding to the first mode, and FIG. 4b shows it corresponding to the second mode. In this embodiment, the keypad 3 is implemented as a so-called touch panel, in which an at least partly transparent touch-sensitive means 13 is placed onto the display 4. This touch-sensitive means 13 detects a pressing on it, wherein the controller (not shown) of the touch-sensitive means can determine the coordinates of the contact point and transmit this coordinate information to the processor 11 of the communication device (FIG. 5). After this, the processor 11 can retrieve the operations defined for the point in question. For example, the key functions can be implemented by means of the touch-sensitive means in such a way that a certain area on the surface of the touch-sensitive means corresponds to a certain keystroke. The transfer of the user's keystrokes to the touch-sensitive means can be implemented e.g. by providing the second part 2a of the housing 2 of the communication device, with keys 3a-3l. When a key is pushed down, it goes down to the surface of the touch-sensitive means, wherein the contact is detected and the information is transmitted to the processor 11. For playing games, the second part 2a can be replaced by a replacement cover 5 (FIG. 4b) provided with keys arranged for game functions, as presented in connection with the description of the first advantageous embodiment of the invention. Thus, as a result of the shift to the game mode, the strokes of the keys 6a-6f in the keyboard 6 of the replacement cover are interpreted differently than the strokes of the keys 3a-3l of the second part. The solution according to this embodiment has e.g. the advantage that the layout of the keys 6a-6f in the keyboard 6 of the auxiliary part can be implemented more freely, irrespective of the layout of the keys 3a-3l in the keypad 3 of the second part. Furthermore, the display area can be made larger, since the display 4 can be extended even to the keys of the keypad 3, even if, in the normal mode, a smaller area of the display 4 were used for display functions (indicated with reference 14 in FIGS. 4a and 4b).

FIG. 5 further shows a communication device 1 complying with the first preferred embodiment of the invention in a reduced block chart. It comprises, in addition to the functional parts presented above in this description, preferably at least audio means 15, such as an earpiece and/or a speaker and a microphone.

Different alternatives for the user interface UI1 of the communication device according to the invention can also be used for other purposes than playing games. For example, Internet browser programs have accelerator key functions for facilitating the browsing of home pages. For example, browsing forward, backward, stopping and moving to a default home page can be performed by selecting one single dialog box. In computers, an indicating device is normally used for this function, but in the communication device according to the present invention, this can be advantageously implemented so that for browsing in the Internet, the user changes a replacement cover 5 for the communication device, designed for this purpose and provided with separate keys e.g. for the above-mentioned browsing functions. Furthermore, different keyboard alternatives can also be implemented in calendar functions, calculator functions, PDA applications, or the like.

Figure 6A:
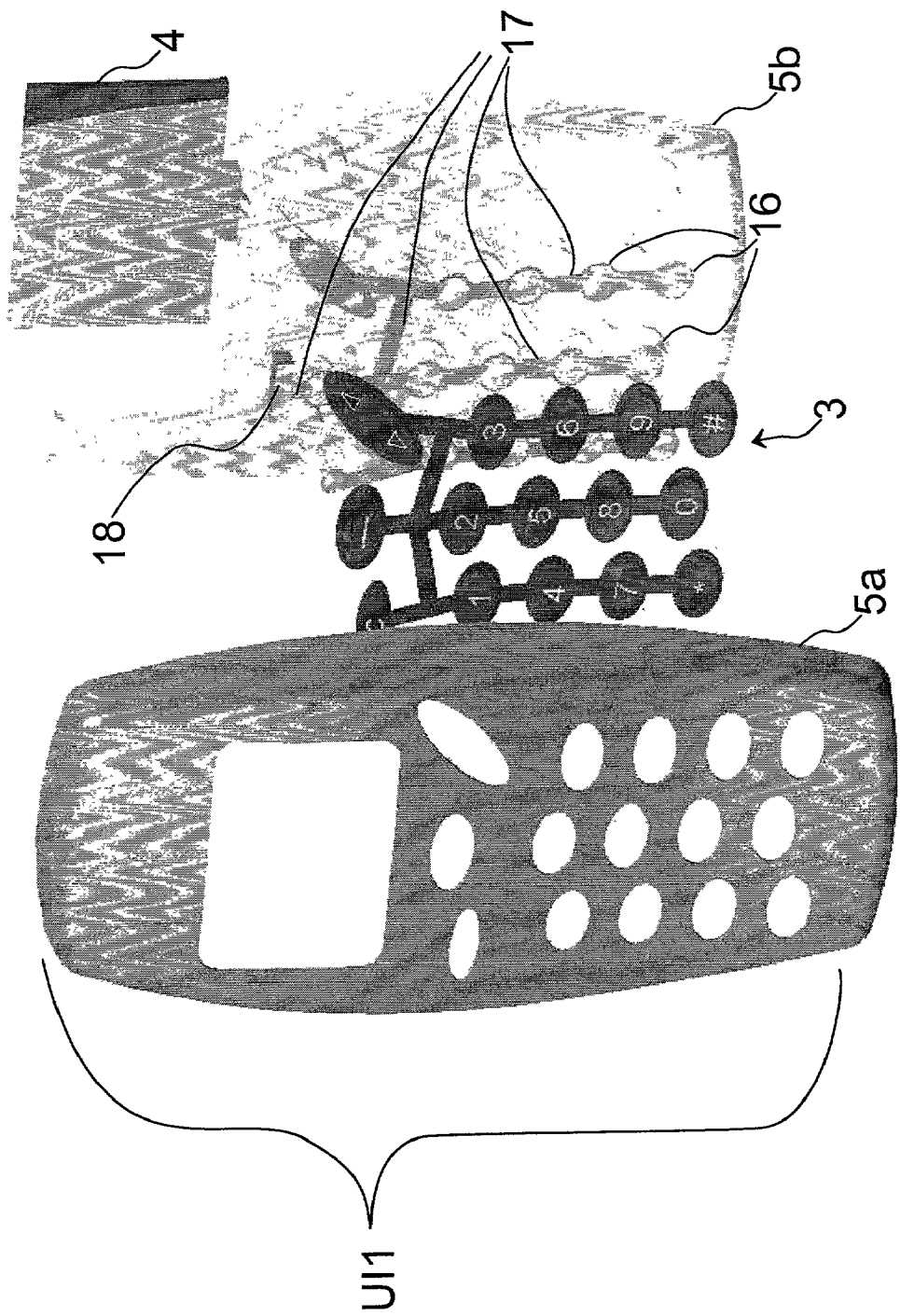
FIG. 6a shows a replacement cover for a communication device according to a fourth advantageous embodiment of the invention in a partial explosion view.
Figure 6C:
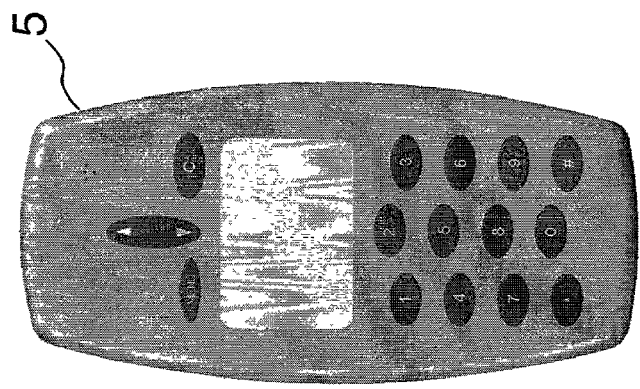
FIGS. 6b to 6e show examples of user interfaces implemented with the cover structure of FIG. 6a, and FIG. 7 shows, in a reduced cross-section, a communication device according to the fourth advantageous embodiment of the invention.
Figure 6B:
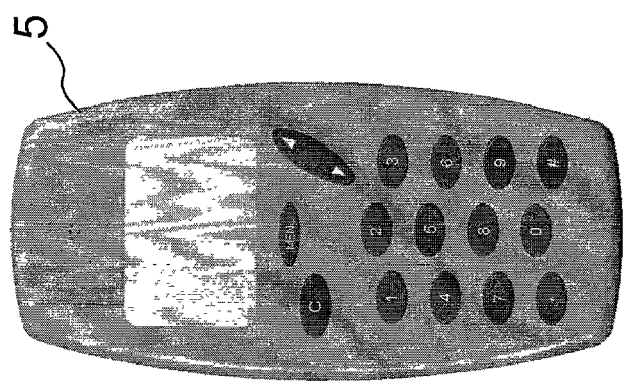
Figure 6E:
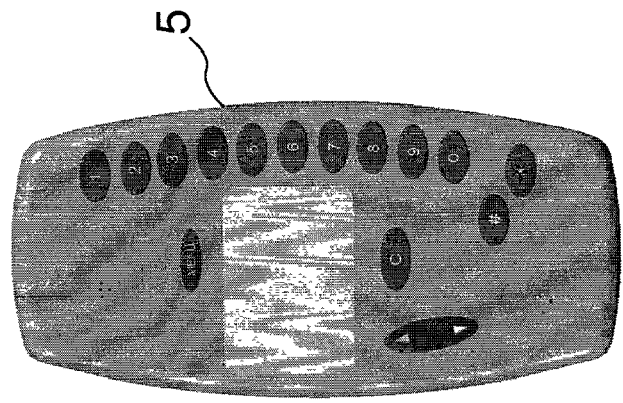
Figure 6D:
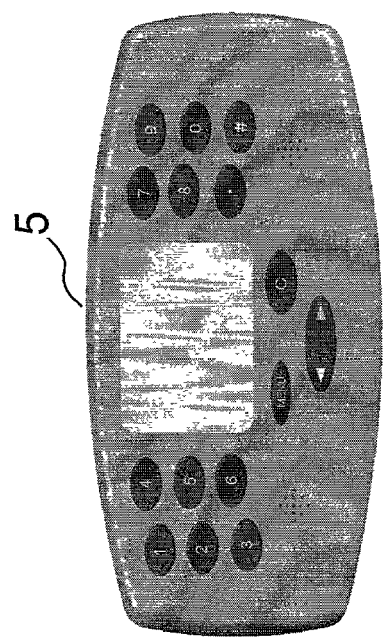
Figure 7:
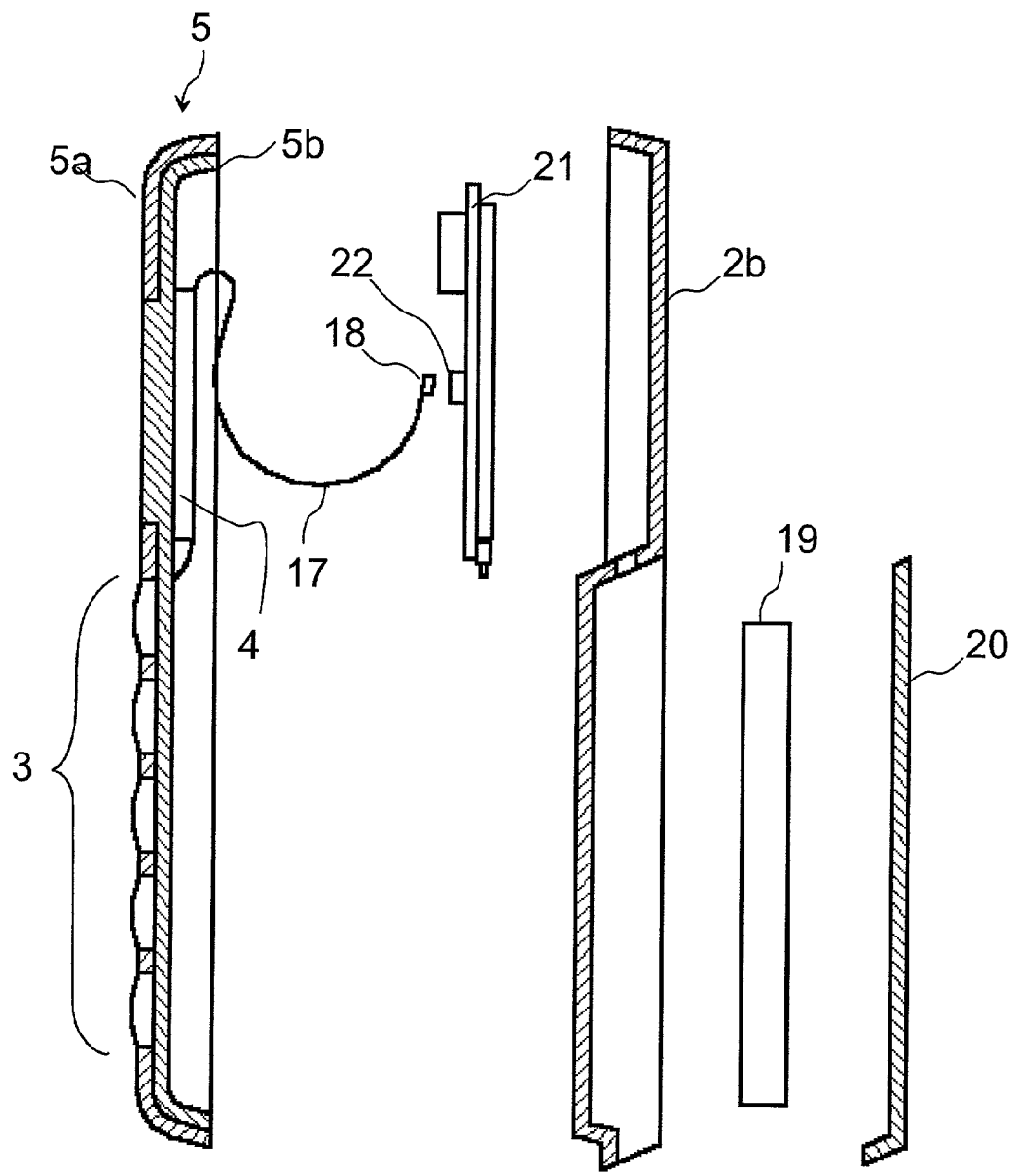

The appended FIG. 6a shows, in a partial explosion view, a replacement cover structure to be used in connection with a communication device according to the fourth advantageous embodiment of the invention. In a corresponding manner, FIGS. 6b-6e show different examples of user interfaces implemented with this structure. In this advantageous embodiment, the replacement cover 5 comprises a second part 5a, a functional cover 5b, a keypad 3, and a display 4. The second part 5a is visible when the replacement cover 5 is installed in its position. The second part 5a is provided with openings at the keys of the keypad 3. Furthermore, at the display 4, there is either an opening, or the second part 5a is otherwise arranged to be at least partly transparent in this area, e.g. as a window implemented with transparent plastic. The keypad 3 is placed behind the second part 5a. In a way known as such, it can be made of a flexible material and provided with the desired keys. Furthermore, this keypad is advantageously provided with symbols to indicate the function corresponding to each key. This keypad 3 is used to transmit the keystrokes to key elements 16 arranged in connection with the functional cover 5b. When the corresponding key is being pressed down, these key elements 16 generate an electrical signal or turn a switch on/off, wherein information about the keystroke is transferred to the processor 11 or to another means for detecting keystrokes in the communication device, such as a keyboard controller (not shown), known as such. To transfer this keystroke information, the replacement cover 5 is provided with conductors 17 coupled to a connector 18. This connector 18 is arranged to be coupled to another electronics part 21 (FIG. 7), preferably connected to the first part 2b of the housing 2 in the communication device. Thus, at the stage of installing the replacement cover 5, the user couples the connector 18 to a corresponding connection 22 in the electronics part (FIG. 7). The length of the conductors 17 can be selected so that, irrespective of the layout of the keypad 3 and the display 4, the connector 18 can be coupled to the corresponding connection 22 in the electronics part. By means of this connector 18, it is also possible to transfer information between the display 4 and the electronics part, or the replacement cover 5 can be provided with another connector for this purpose. If necessary, the connector 18 can also be used for indicating the layout of the user interface Ul1 of the replacement cover attached at the time, to the other electronics 21 of the communication device 1. This can be arranged e.g. so that specific pins of the connector 18 indicate the type of the replacement cover in question. For example, three pins can be used to provide eight different alternatives, if binary signals (0/1) are used in the pins. Thus, the type of the replacement cover corresponding to each binary combination is stored in the communication device 1. For the other pins, it is possible to define either a fixed use, such as the transfer of key signals or display signals, or the pins can be configured in a way known as such, wherein the configuration of the pins can also be indicated in the type of the replacement cover.

The functional cover 5b is preferably photoconductive, wherein it can be used for illuminating the keyboard 5 and for conducting light to desired points, such as to the display 4, from the front, from the side, or from behind. Thus, background light can be replaced by light conducted to the display by means of the cover. Through the functional cover 5b, light can also be conducted to illuminate the keypad 3, to illuminate various figures, such as manufacturer logos, and to provide other light effects, such as stripes, in the communication device 1. These light effects can also be used for indicating e.g. an incoming call. Such a photoconductive functional cover 5b can thus be used to replace separate light guides or the like which are used in communication devices of prior art, for example for illuminating the keys or producing illuminated figures in the communication device 1. The functional cover 5b is primarily designed to correspond to the shape of the second part 5a in such a way that the functional cover 5b can be placed against the inner surface of the second part 5a. Thus, when assembled, this second part 5a, the keypad 3, the key elements 16, the functional cover 5b, and the display 4 constitute an integrated functional unit which can be attached to the housing 2 of the communication device by applying mechanisms known as such. It is thus possible to manufacture a variety of replacement covers 5, from which the user can select an alternative suitable for each use and/or according to his/her preference. FIGS. 6b-6e show some advantageous designs for the replacement cover 5. Different designs may be equipped with different key functions. Furthermore, in different designs, the same key functions can be placed in different ways, wherein the present invention can also be applied in the same functions to consider different use preferences.

This layout for the user interface of the replacement cover 5b according to the fourth advantageous embodiment of the invention is not dependent on the layout of the other electronics part 21 of the communication device, wherein the properties and location of the display 4 of the communication device 1 can be changed by changing the replacement cover 5. The different replacement covers 5 can be provided with different displays 4, for example a monochrome or colour display. Furthermore, the resolution of the display can vary in the displays 4 of the different replacement covers 5. Thus, for example for playing games and/or browsing in the Internet, the user can change a replacement cover 5 equipped with a display 4 with a higher resolution than the display to be normally used for telephone functions. In this embodiment, no circuit board is needed underneath the keypad 3, wherein the keypad 3 can be made simpler than keypads of prior art. This will also reduce the need for space of the user interface Ul1 of the replacement cover.

Using the above-presented replacement cover 5, the dimensions of the other electronics part 21 of the communication device 1 can be standardized, if necessary, which facilitates the design of new device versions and accelerates product development. Thus, for producing new device versions, it is sufficient that the replacement cover 5 is changed. As already presented above, these replacement covers 5 can be very different from each other, although the first part 2b of the housing and the other electronics part would remain unchanged. FIG. 7 shows, in a reduced cross-section, a communication device 1 complying with the fourth advantageous embodiment of the invention. The first part 2b of the housing is equipped with a battery housing for a battery 19, and a cover 20 for protecting the battery 19. The electronics part 21 can be preferably placed in connection with the first part 2b.

The above-described solution according to the fourth advantageous embodiment of the invention can also be applied in connection with the touch panel mentioned earlier in this description. Thus, the touch-sensitive means 13 is preferably placed in connection with the housing 2. In this case, the replacement cover 5 does not necessarily require a display nor key elements 16. The keystrokes from the keypad 3 are transferred by means of the functional cover 5b to the surface of the touch-sensitive means 13, wherein the keystroke is detected and the coordinates of the contact point are determined. The second part 5a of the replacement cover is equipped with an opening or a transparent part in that part of the touch panel which is reserved for displaying visual information in the communication device, that is, substantially at the display area 14 (FIGS. 4*a* and 4*b*). In different replacement covers, the display area 14 and the keypad can have varying layouts and sizes, wherein information is transmitted to the processor 11 of the communication device about the layout of the display area and the keys of the keypad 3 in the different replacement covers.

A communication device 1 according to a fifth advantageous embodiment of the invention comprises a replacement cover which has larger keys or touchable areas than the keys or touchable areas of keypads of prior art mobile communication devices. The larger keys or touchable areas are intended to be better seen and operated by people with reduced eyesight. Also disabled people may have difficulties with using the prior art keypad having small keys. The keys of the replacement cover according to the fifth advantageous embodiment of the present invention are preferably designed so that when a key of the replacement cover is pressed, it presses one key of the actual keypad of the communication device. However, this means that all the keys of the actual keypad can't be implemented in the replacement cover. Therefore, if all the numeric keys are needed, the replacement cover according to the fifth advantageous embodiment of the present invention is suitable for mobile communication devices comprising a keyboard which also has other keys than numeric keys, e.g. alphabetical keys. Then it is possible to arrange all numeric keys which are big enough for people with reduced eyesight and for disabled people. It is also possible that the replacement cover according to the fifth embodiment of the present invention is used with a numeric keypad. In that case only some of the keys of the numeric keypad can be implemented in the replacement cover. This can, however, be enough because many prior art mobile communication devices have a property in which a telephone number can be programmed to one key. Then that number can be selected only by pressing that key, ie. onetouch speed dialing. Therefore it is possible to program the most important telephone numbers to those keys which can be pressed by the keys of the replacement cover.

The above-described solution according to the fifth advantageous embodiment of the invention can also be applied in connection with the touch panel if the size of the touch panel is big enough for implementing larger touchable areas for providing key functions.

The communication device 1 is preferably equipped with detecting means for transferring information, preferably to the processor 11, on whether the replacement cover 5 is attached to the housing 2 of the communication device. Furthermore, if the replacement cover 5 is attached, information is preferably also transmitted on the type of the replacement cover 5, wherein the communication device 1 is capable of reacting correctly to the keystrokes and displaying information in the correct area of the display 4. Moreover, if the touch screen is used, information is transmitted to the processor 11 also on the location of the display area and/or the key layout of the keypad 3. These detecting means may comprise e.g. a switch (not shown) which is in different positions depending on whether the replacement cover 5 is attached to the housing 2 or not. The detecting means can also be arranged in connection with the connector 18, or the keypad 3 and/or the keypad 6 can be used as the detecting means, wherein the user can define the settings.

It is obvious that the replacement cover 5 according to the invention can also be equipped with e.g. a joystick, a control ball, a speaker/earpiece, a microphone, etc.

It is obvious that the present invention is not limited solely to the above-presented embodiments, but it can be modified within the scope of the appended claims. For example, also the housing 2 can be equipped with keys, such as a current switch.

What is claimed is:

1. A communication device comprising at least::
   a housing having at least a first part and a second part, and
   a user interface, including at least a first keypad and a display, wherein a portion of the user interface is arranged to be replaceable by placing a replacement cover not always present on the communication device in a detachable manner in connection with the housing,
   wherein the second part is adapted to be removed before inserting the the replacement cover in place of the second part, and that said replacement cover includes at least keys for applications and changing the functionality of the first keypad,
   and wherein at least part of the first keypad is provided in said replacement cover.

2. The communication device according to claim 1, wherein the replacement cover includes a display.

3. The communication device according to claim 1, wherein the replacement cover includes at least a cover part and a functional cover, that the keys for applications includes key elements for detecting a pressing of the keys of the first keypad, and that the replacement cover further comprises means for transferring information about the keystrokes to the communication device.

4. The communication device according to claim 1, wherein the second part includes the first keypad, wherein the keys for applications includes a second keypad, wherein the replacement cover is arranged to be fixed onto the second part, and that the keys of said second keypad are placed in such a way that when the replacement cover is fixed onto the second part, at least some of the keys of the second keypad are at the location of at least one key of the first keypad, wherein the user interface includes the display and the second keypad.

5. The communication device according to claim 4, wherein the communication device includes means for activating the keys of the second keypad to function non-simultaneously with the keys of the first keypad.

6. The communication device according to claim 1, wherein it is a wireless communication device.

7. The communication device according to claim 1, wherein the keys for applications of the replacement cover includes a one touchable area for a key function which touchable area is larger than the touchable area of the first keypad.

8. A method for changing the user interface in a communication device including at least a housing having at least a first part and a second part, and means for providing user interface functions having at least a first keypad and a display, the method comprising:
   changing the user interface by removing the second part and placing a replacement cover not always present on the communication device in a detachable manner in connection with the housing and in place of the second part,
   equipping the replacement cover with at least means for providing keys for applications and changing the functionality of the first keypad, and
   providing at least part of the first keypad in the replacement cover.

9. The method according to claim 8, including:
   placing the first keypad in the replacement cover which is formed of a cover part and a functional cover, and which replacement cover is equipped with key elements for detecting the stroke of keys of said first keypad, and transferring information about the keystrokes from the replacement cover to the communication device.

10. The method according to claim 8, including providing the replacement cover with a second keypad in such a way that when the replacement cover is fixed onto the second part of the housing, at least some of the keys of the second keypad are located by at least one key of the first keypad.

11. A communication device comprising at least:

a housing having at least a first part and a second part, and means for providing user interface functions, including at least a first keypad and a display, wherein a portion of the user interface functions are arranged to be replaceable by placing a replacement cover not always present on the communication device in a detachable manner in connection with the housing, wherein the second part is adapted to be removed before inserting the replacement cover in place of the second part, and that said replacement cover includes at least means for providing keys for applications and changing the functionality of the first keypad, and wherein at least part of the first keypad is provided in said replacement cover.

* * * * *